(12) United States Patent
Choi et al.

(10) Patent No.: US 6,445,387 B1
(45) Date of Patent: Sep. 3, 2002

(54) INTERFACE METHOD FOR SEARCHING VIRTUAL SPACE BASED ON BODY ICON

(75) Inventors: Jeong Dan Choi; Chan Su Lee; Jin Seong Choi; Chan Jong Park, all of Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/417,660

(22) Filed: Oct. 14, 1999

(30) Foreign Application Priority Data

Nov. 4, 1998 (KR) .............................. 98-47213

(51) Int. Cl.[7] .............................................. G06T 17/00
(52) U.S. Cl. ........................................................ 345/419
(58) Field of Search ................................ 345/418, 419, 345/420, 421, 426, 427

(56) References Cited

U.S. PATENT DOCUMENTS

| | | | |
|---|---|---|---|
| 5,561,758 A | 10/1996 | Hocker et al. | 395/159 |
| 5,619,637 A | 4/1997 | Henshaw et al. | 395/159 |
| 5,684,970 A | 11/1997 | Asuma et al. | 395/348 |

OTHER PUBLICATIONS

Cleotilde Gonzalez, "Visual Interaction Design," SIGCHI Bulletin, vol. 27, No. 1, Jan. 13, 1995.
Jun Rekimoto, "Pick–and–Drop: A Direct Manipulation Technique for Multiple Computer Environments," UIST 97 Banaff, Alberta, Canada, ACM 0–89791–9/97, pp. 31–39.
Doug A. Bowman, David Koller and Larry F. Hodges, "Travel in Immersive Virtual Environments: An Evaluation of Viewpoint Motion Control Techniques," Georgia Institute of Technology, Atlanta, GA, 0–8186–7843–7/97, pp. 45–52.

*Primary Examiner*—Cliff N. Vo
(74) *Attorney, Agent, or Firm*—Antonelli, Terry, Stout & Kraus, LLP

(57) ABSTRACT

A virtual space search interface is provided to search a three-dimensional virtual space image by the visual angle of a virtual user immersed therein. The virtual space search interface engine interfaces the movement of the virtual user so as to adjust it with a mouse in such a way as the movement of a visual line of the body, displays an ICON which can adjust a three-dimensional motion with a mouse on the main image in which the search is made and enables the ICON to search a three-dimensional virtual space image by selecting an element of changes of a gaze, controlling changes of movement in horizon, its moving speed and 2-dimensional movement of neck. Consequently, movement is more free than the use of various ICONs. Since the user is well acquainted with the ICON which represents the body, the user knows what manipulation is good and when such manipulation can be executed so that a virtual space can be searched easily.

4 Claims, 4 Drawing Sheets

(a)

(b)

(c)

(d)

INTERFACE METHOD FOR SEARCHING VIRTUAL SPACE BASED ON BODY ICON

BACKGROUND OF THE INVENTION

1. Field of the Invention

The present invention relates to an interface method for searching a three-dimensional virtual space by using body ICON. More particularly, it relates to a interface method, which searches a three-dimensional virtual space image in the visual angle of a user immersed by the conversational operation of a body ICON.

2. Description of the Prior Art

Generally, virtual space search forms a conclusion by the manipulation of a virtual camera. The real world changes according to the movement of a view line and a change in virtual space, which represents this real world on a computer must also reflect the movement of a view line. The change in such a visual line includes a change caused by the movement of a position, a change caused by standing stature and seated stature in the original place and a change caused by up-and-down movement of the head.

However, such an input device like a mouse or a joystick that we use in the main is a two-dimensional device. The movement of a camera, which corresponds to the movement of the input device, is two-dimensional in any one moment. So, when it is represented by the existing two-dimensional input method, only a change in visual line caused by the movement of a position is expressed, or other method is not supported or it is represented by one instrument or more. For that reason, a virtual space searcher feels disconnected with reality.

At present, many methods have been developed for three-dimensional space search, but most interfaces are not intuitive and it is inconvenient to use them. Due to inconvenience of search, it is difficult for the user to change his view line or direction to a place he is to search in the three-dimensional virtual world and there are many instances where the result of undesired action presents itself.

The present invention relates to an interface, which enables a general user to search a virtual space very intuitively and move accurately in a desired direction by search control interface technique, which solves the problem of such a search interface.

SUMMARY OF THE INVENTION

Accordingly, an object of the present invention is to provide an method which interfaces an ICON made by simplifying a virtual user so as to adjust it by the visual angle of a user immersed in three-dimensional virtual space image without a device which senses the movement of the human body and without using various instruments and then searches a virtual space.

An interface method for searching a three-dimensional virtual space image based on body ICON of the present invention comprises the step of: adjusting the movement of a virtual user for searching a three-dimensional virtual space image by elements such as the vertical height, the vertical angle, the horizontal direction and the position movement of a view line of the virtual user in such a way as the movement of the view line of the virtual user in actual life; and searching the three-dimensional virtual space image by displaying the ICON on the screen of main image for searching, and selecting each element of the displayed ICON and adjusting the vertical height, vertical angle, horizontal direction and searching position of a visual line according to the two-dimensional adjustment.

The present invention is characterized by that in order to provide a virtual space search interface method by conversational manipulation of a body ICON which searches a three-dimensional virtual space image by the view angle of the user immersed an ICON which can adjust the movement of a searcher by separating the vertical height, vertical angle and horizontal angle of the view line respectively is formed, and the ICON is shown on search image screen and the ICON is interfaced so that the searcher may adjust it with a mouse in such a way as the movement of the view line of the body in actual life.

The present invention realizes an interface which supports a search on the virtual space by operating the ICON made by simplifying the human body without a complication like attachment of a tracker or an optical device which senses the movement of the human body which changes the view line.

As against a problem posed by that three-dimensional environment depends on a two-dimensional input method and a newly rising three-dimensional input method which is not intuitive, the present invention can produce the same effect as changing the degree of freedom related to the view line in the actual world, namely, the movement of the view line caused by the forward and backward movement of the human body and the upward, downward and lateral movement of the head by manipulating the human body in the same way as moving it with an ICON which introduced two figures of a circle and a transformed tetragon which are the most simple forms of a figure.

BRIEF DESCRIPTION OF THE DRAWINGS

Other features and advantages of the invention will be apparent from the following description taken in connection with the accompanying drawings wherein.

DETAILED DESCRIPTION OF THE PREFERRED EMBODIMENT

The present invention forms a body ICON so as to adjust the movement of a virtual user for searching a three-dimensional virtual space image by elements such as the vertical height, vertical angle, horizontal direction and position movement of a view line in such a way as the movement of the view line in actual life.

The body ICON comprises a first element which adjusts a change made when a view line moves upward and downward vertically due to a vertical change in stature by adjusting a two-dimensional motion with a mouse on the main image, a second element which adjusts a change made when a view line moves upward and downward vertically due to a vertical change of a neck in the position of fixed stature and a third element which adjusts the rotary movement of a view line from side to side and the straight movement of a searching position due to a lateral change of the neck in the position of fixed stature.

The three-dimensional virtual space image is searched by interfacing the body ICON so as to adjust the height, the angle, the direction and the position of a view line which are for searching a virtual space according to the state by elements, by displaying the body ICON on the screen of main image for searching, by selecting such element of the displayed ICON with a mouse and by adjusting the height, the vertical angle, the horizontal direction and the searching position of a view line according to the two-dimensional adjustment.

In an embodiment of the present invention, a large circle which adjusts the vertical height by changing a vertical diameter and a horizontal diameter is shown as the first element of the body ICON, a circular column which changes the height is shown as the second element and a small circle is shown as the third element, but the shape by elements of the ICON can be shown by various figures. However, a three-dimensional space search can be made on the basis of a change in actual man's view line by adjusting a change in view line by elements to make a three-dimensional search by means of two-dimensional adjustment..

The present invention will now be described in more detail with reference to the accompanying drawings.

Figure 1:
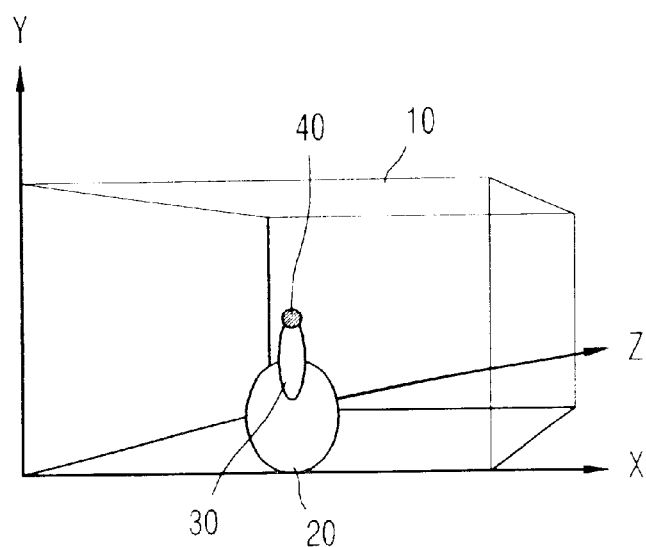
FIG. 1 is a schematic diagram of a window showing a virtual space to be searched according to the present invention.

FIG. 1 is a schematic diagram of a window showing a virtual space and ICON to be searched according to the present invention.

Referring to FIG. 1, the window, which shows a virtual space to be searched to perform interface according to the present invention comprises a main image(10) in which a search is made, a large circle(20) which shows a change made when a view line of virtual user moves up and down vertically due to a vertical change in stature by adjusting a two-dimensional movement with a mouse on the main image(10), a circular column(30) which shows a change made when a view line of virtual user moves up and down vertically due to a vertical change in the neck of the body in the position of fixed stature and a small circle(40) which shows a change made when a view line of virtual user moves from side to side due to a lateral change in the neck of the body in the position of fixed stature.

Figure 2:
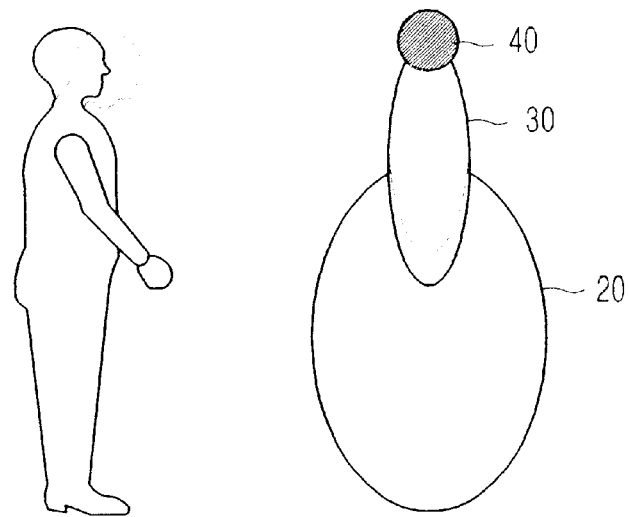
FIG. 2 is a schematic diagram of a body ICON according to the present invention.

Referring to FIG. 2, the ICON shows the movement of a view line of virtual user by means of the large circle(20) which shows the height of a central body of the body, the circular column(30) which shows that a neck of the body moves vertically and the small circle(40) which shows that the neck of the body moves horizontally.

In other words, the ICONs(20 to 40) are selected for a change in the view line desired by the ICONs which show a virtual user and if a mouse is moved in a desired direction and at a desired speed, a change in the visual line by the movement of the virtual user can be shown by applying a changed angle and a changed quantity to the ICONs.

The method of searching a virtual space image by using those ICONs formed in such a way enables the virtual space image to be searched by means of the body ICON through a first process which adjusts vertical height which corresponds to a change in stature by adjusting the vertical height of the large circle(20), a second process which adjusts the vertical angle of a view line in the fixed position according to a vertical change in the neck of the body by adjusting the vertical size of the circular column(30), a third process which adjusts the direction of a view line revolving it from side to side by selecting the small circle(40) and a fourth process which adjusts a searching position by moving straightly the direction of a view line in forward, backward and lateral directions by selecting the small circle(40).

Figure 3:
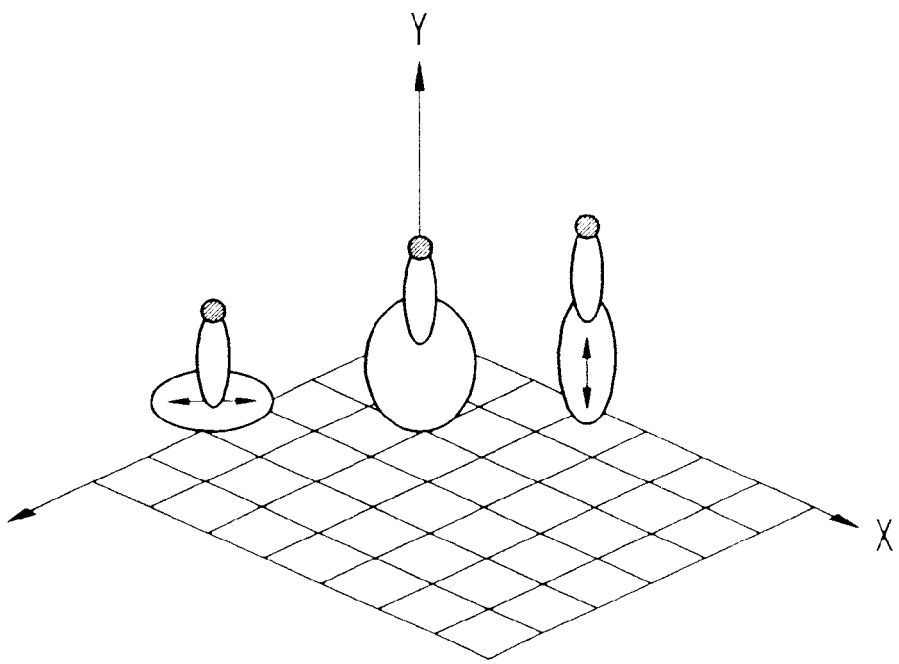
FIG. 3 is an illustration of a change in the vertical height of a view line in virtual space image followed by the operation of body ICON according to the present invention.

FIG. 3 is an illustration of adjusting the vertical height by adjusting the large circle(20) followed by a change in stature. As illustrated, the large circle(20) enables a virtual user to adjust his stature by decomposing a changed quantity into horizontal and longitudinal components with a mouse in order to show a three-dimensional space image which makes a change when a view position or point moves up and down vertically due to a vertical change in stature. In other words, when the large circle(20) shows a circle which has the same radius in length and width, the view point of the virtual user is at the position whose height is 80% of maximum height in virtual space. When the large circle(20) is selected by using mouse and shows ellipse by moving up and down the mouse, the view line of the virtual user moves up and down vertically the virtual space image. Herein, the maximum of the view point of virtual user cannot be higher than the maximum height of the virtual space.

FIGS. 4A to 4D are illustrations of adjusting a change in vertical angle under condition that vertical height is fixed.

Figure 4:
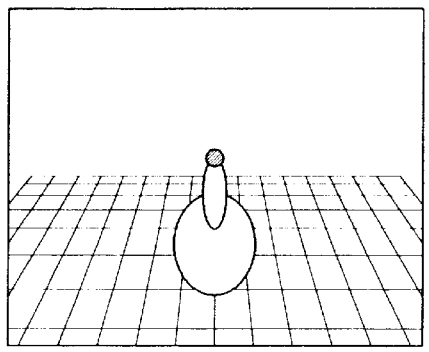
FIGS. 4A to 4D are illustrations showing an angular change in vertical view line in virtual space image resultant from the operation of the body ICON according to the present invention.
Figure 4:
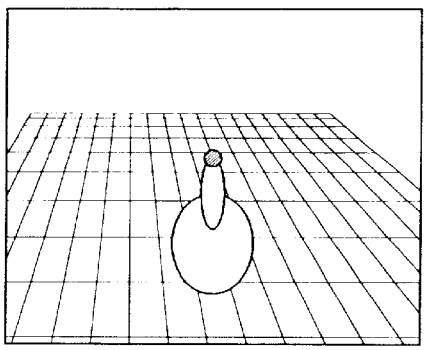
Figure 4:
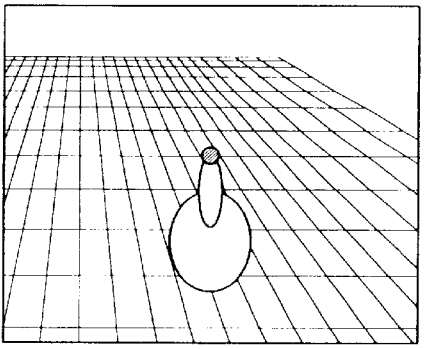
Figure 4:
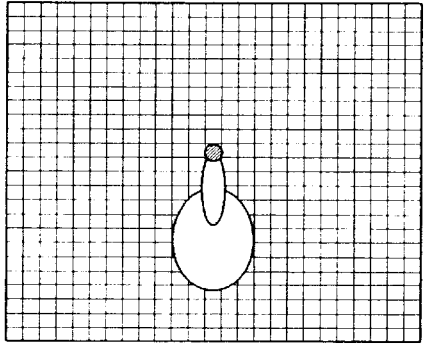

The circular column(30) enables the virtual user to adjust the vertical movement of his neck with a mouse in order to show a three-dimensional virtual space image which makes a change when a visual line moves up and down vertically due to a vertical change in his neck in the position of fixed stature. In other wards, the circular column(30) sets as a standard (FIG. 4B) the time when the virtual user forms a view line at angle of 15° in a standing posture in actual life and. The virtual space image that an angle formed by a neck and the trunk changes toward the outer side of the trunk than the standard is shown in FIG. 4A. But the virtual space image that the angle formed by a neck and the trunk changes toward the inner side of the trunk than the standard is shown in FIG. 4C. The virtual space looked at vertically when a neck and the trunk are nearest to each other is shown in FIG. 4D, the maximum angle at which the neck is inclined is applied by limiting the angle to the height of circular column.

Figure 5:
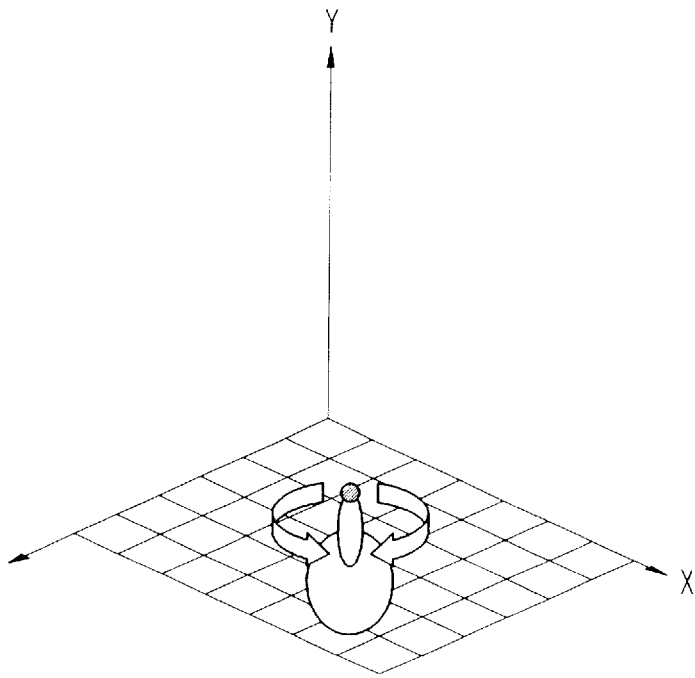
FIG. 5 is an illustration showing a change in horizontal direction in virtual space image resultant from the operation of the body ICON according to the present invention.

FIG. 5 is an illustration of adjusting the searching direction of horizontal direction under condition that height is fixed and a vertical angle is fixed.

The small circle(40) of the ICON enables the virtual user to adjust the horizontal movement of the neck of the body with a mouse in order to show a three-dimensional virtual space image which is changed when a view line moves from side to side on the plane due to a lateral change of the neck in the position of fixed stature. In other words, the small circle(40) enables the virtual user to set a view point by selecting the small circle with a mouse in the desired direction of a view line so as to show the effect of rotating in a 360-degree arc at which the view line can be moved horizontally in a stepping posture in actual life.

Figure 6:
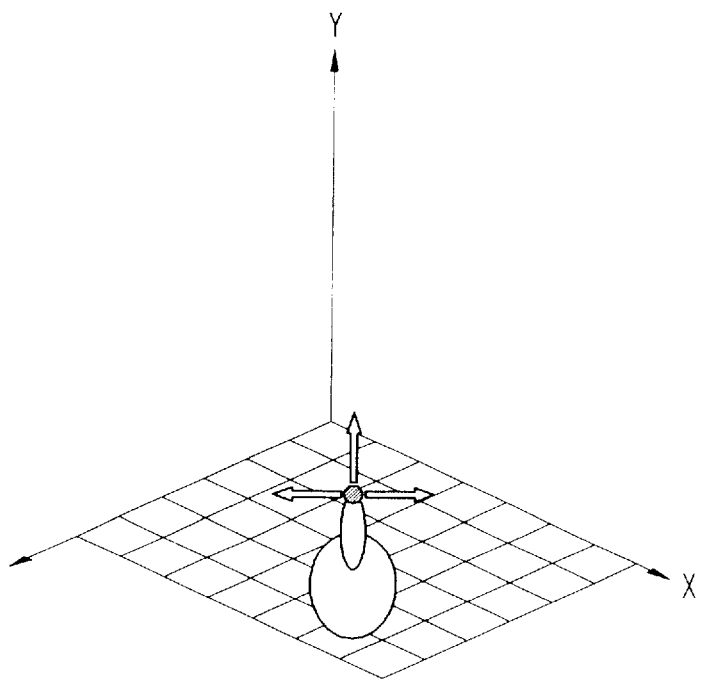
FIG. 6 is an illustration showing a horizontal position movement in virtual space image resultant from the operation of the body ICON according to the present invention.

FIG. 6 is an illustration of adjusting a searching position. The small circle(40) of the ICON enables the virtual user to adjust the whole movement of the body with a mouse in order to show a three-dimensional virtual space image which is changed when a view line moves forward, backward and from side to side due to a change in the movement of front, rear, left and right positions on virtual space.

In other words, the small circle(40) enables the virtual user to set a view point by selecting the small circle with a mouse in the desired direction of view line through the movement of front, rear, left and right positions as the same effect as changing a view line by really moving the body in actual life.

As referred to the above, if the body ICON is used for searching a virtual space of the present invention, the movement is free and the virtual user can knows well a change of view point in actual life. For that reason, the virtual user can be well aware of what manipulation is good, thus searching the virtual space much easily.

What is claimed is:

1. An interface method for searching a three-dimensional virtual space image based on body ICON, comprising the step of:

adjusting a movement of a virtual user for searching the three-dimensional virtual space image by elements such as a vertical height, a vertical angle, a horizontal direction and a position movement of a view line of the virtual user in such a way as the movement of the view line of the virtual user in actual life; and searching the three-dimensional virtual space image by displaying the ICON on a screen of main image for searching, and selecting each element of the displayed ICON and adjusting the vertical height, the vertical angle, the horizontal direction and the searching position of the view line according to two-dimensional adjustment.

2. The method as defined in claim 1, in which the body ICON adjusts two-dimensionally the visual change in the body by comprising:

a first element adjusting a change made when the view line moves up and down vertically due to a vertical change in stature by adjusting a two-dimensional motion with a mouse on the main image;

a second element adjusting a change made when the view line moves up and down vertically due to a vertical change of a neck of the body in the position of fixed stature; and a third element adjusting a rotary movement of the view line from side to side and a straight movement of the view line in the searching position due to a lateral change of the neck of the body in the position of fixed stature.

3. The method as defined in claim 2, in which the first element is a large circle which corresponds to the change in stature by adjusting the vertical height by means of the change in vertical and horizontal diameters, the second element is a circular column which is partially lapped on the large circle and corresponds to the change at the vertical angle of the neck of the body by means of the change in vertical height, and the third element is a small circle which is formed on the top part of the circular column and corresponds to the lateral direction of the view line according to the lateral rotation of the neck of the body by means of rotating direction.

4. The method as defined in claim 2, in which the adjusting method of the view line based on body ICON comprises the steps of:

adjusting the vertical height which corresponds to the change in stature by adjusting the vertical height of the first element;

adjusting the vertical angle of the view line in the fixed position due to the vertical change of the neck of the body by adjusting the height of the second element;

adjusting the direction of the view line revolving it from side to side by selecting the third element; and adjusting the searching position by moving straightly the direction of the view line in forward, backward and lateral directions.

* * * * *